United States Patent
Tani et al.

(10) Patent No.: US 10,468,680 B2
(45) Date of Patent: Nov. 5, 2019

(54) NICKEL-LITHIUM METAL COMPOSITE OXIDE POWDER AND METHOD FOR PRODUCING SAME

(71) Applicant: UMICORE, Brussels (BE)

(72) Inventors: Hiroshi Tani, Kumamoto (JP); Ralph Otterstedt, Goslar (DE)

(73) Assignee: UMICORE, Brussels (BE)

( * ) Notice: Subject to any disclaimer, the term of this patent is extended or adjusted under 35 U.S.C. 154(b) by 271 days.

(21) Appl. No.: 15/505,073

(22) PCT Filed: Aug. 20, 2015

(86) PCT No.: PCT/JP2015/073407
§ 371 (c)(1),
(2) Date: Feb. 18, 2017

(87) PCT Pub. No.: WO2016/031677
PCT Pub. Date: Mar. 3, 2016

(65) Prior Publication Data
US 2017/0256794 A1 Sep. 7, 2017

(30) Foreign Application Priority Data

Aug. 28, 2014 (JP) ................................. 2014-174150

(51) Int. Cl.
| | |
|---|---|
| *H01M 4/525* | (2010.01) |
| *B22F 9/02* | (2006.01) |
| *B22F 9/16* | (2006.01) |
| *C01G 53/00* | (2006.01) |
| *H01M 4/02* | (2006.01) |

(52) U.S. Cl.
CPC ............... *H01M 4/525* (2013.01); *B22F 9/02* (2013.01); *B22F 9/16* (2013.01); *C01G 53/006* (2013.01); *C01G 53/42* (2013.01); *H01M 4/02* (2013.01); *B22F 2301/054* (2013.01); *B22F 2301/15* (2013.01); *H01M 2004/028* (2013.01)

(58) Field of Classification Search
CPC .. H01M 4/525; H01M 4/02; H01M 2004/028; C01G 53/42; C01G 53/006; B22F 9/02; B22F 9/16; B22F 2301/054; B22F 2301/15
USPC ....................................................... 429/527
See application file for complete search history.

(56) References Cited

U.S. PATENT DOCUMENTS

2007/0248883 A1* 10/2007 Oda ...................... H01M 4/525
429/231.1

FOREIGN PATENT DOCUMENTS

| | | |
|---|---|---|
| CN | 1706058 | 12/2005 |
| CN | 101047237 | 10/2007 |
| CN | 101595581 | 12/2009 |
| CN | 101836314 | 9/2010 |
| JP | 2001080920 | 3/2001 |
| JP | 2004171961 | 6/2004 |
| JP | 2004220897 | 8/2004 |
| JP | 2007257985 | 10/2007 |
| JP | 2009176528 | 8/2009 |
| JP | 2012253009 | 12/2012 |
| JP | 2013065468 | 4/2013 |
| WO | 2011105126 | 9/2011 |

OTHER PUBLICATIONS

"Office Action of China Counterpart Application," dated Aug. 29, 2018, with English translation thereof, pp. 1-p17.
"International Search Report (Form PCT/ISA/210) of PCT/JP2015/073407", dated Oct. 27, 2015, with English translation thereof, pp. 1-4.
"Office Action of China Counterpart Application," dated Mar. 1, 2019, with English translation thereof, p. 1-p. 6.

* cited by examiner

*Primary Examiner* — Gary D Harris
(74) *Attorney, Agent, or Firm* — JCIPRNET

(57) ABSTRACT

To show an LNCAO-type positive electrode active material for a lithium ion battery having a high discharge capacity per unit volume and excellent discharging capacity-holding properties.
Nickel-lithium metal composite oxide powder includes a nickel-lithium metal composite oxide represented by General Formula (1) described below:

$$Li_xNi_{1-y-z}M_yN_zO_{1.7-2.2} \quad (1),$$

in which the breakdown strength of secondary particles is in a range of 80 MPa or less, the density is 3.30 g/cm³ or higher when compressed at a pressure of 192 MPa, and the density is 3.46 g/cm³ or higher when compressed at a pressure of 240 MPa. A method for producing the nickel-lithium metal composite oxide powder includes a water washing step after a firing step for producing a nickel-lithium metal composite oxide powder precursor.

19 Claims, No Drawings

NICKEL-LITHIUM METAL COMPOSITE OXIDE POWDER AND METHOD FOR PRODUCING SAME

CROSS-REFERENCE TO RELATED APPLICATION

This application is a 371 application of the international PCT application serial no. PCT/JP2015/073407, filed on Aug. 20, 2015, which claims the priority benefit of Japan application no. 2014-174150, filed on Aug. 28, 2014. The entirety of each of the above-mentioned patent applications is hereby incorporated by reference herein and made a part of this specification.

TECHNICAL FIELD

The present invention relates to nickel-lithium metal composite oxide powder, a lithium ion battery positive electrode active material including the same, a lithium ion battery positive electrode using the same active material, a lithium ion battery using the same positive electrode, and a method for producing the nickel-lithium metal composite oxide powder.

BACKGROUND ART

The distribution of small electronic devices such as smartphones and tablet personal computers has now made it common for a user to carry and use these small electronic devices outdoors for a long period of time. As a result, a battery, which is a power supply for those small electronic devices, is required to have a high capacity so as to be capable of withstanding the prolonged use. Active research and development is underway regarding a lithium ion secondary battery satisfying the above-described requirement. At the same time, an effort is being made to improve the function and performance of small electronic devices such as smartphones and tablet personal computers, and, in such high-function and high-performance small electronic devices, an increase in power consumption is unavoidable. Therefore, the requirement for increasing the capacity of the battery is gradually intensifying.

In addition, recently, in response to the growing awareness of the crisis in energy supply and demand or environment-oriented consciousness, an increasing number of independent distributive power generation facilities such as wind power generation, mega solar power generation, and domestic solar power generation, which are different from conventional centralized power plants, have been installed. However, the problem of power generation facilities using natural energy such as wind power generation and solar power generation, which is the inferior stability of electric supply to that of the conventional power generation facilities, has not yet been solved. Ever since the deterioration of the power feeding status resulting from the Great East Japan Earthquake occurring on Mar. 11, 2011 and the subsequent nuclear power plant shut down, the importance of securing power at individual plants and houses in case of the occurrence of disasters such as earthquakes has been widely recognized. Therefore, a stationary storage battery enabling the securement of a power supply at individual power-consuming places has been attracting attention. However, according to the current techniques, an extremely large storage facility is required in order to secure electric capacity using the stationary storage battery. Therefore, at the moment, such a storage facility lacks practicality when the residential environment in Japan is taken into account.

Furthermore, in the car industry, an electric vehicle and a hybrid vehicle having favorable energy efficiency have been attracting attention, and active development is underway regarding these vehicles. However, the problems of the insufficient cruising distance resulting from the insufficient battery capacity and the absolute lack of charging facilities in towns have not yet been solved. Therefore, at the moment, electric vehicles relying only on electrical energy as an energy source have not become as widely distributed as hybrid vehicles.

A common product that supports the above-described industries such as electronic devices, power securement, and vehicles is a lithium ion battery, and a common cause of the above-described problems is the lack of capacity per unit volume of the lithium ion battery. A significant cause of the problem of the lack of capacity per unit volume of the lithium ion battery is that the discharge capacity per unit volume of a positive electrode active material used for the lithium ion secondary battery is small.

As the positive electrode active material for the lithium ion battery, a cobalt-based positive electrode active material represented by lithium cobalt oxide (LCO) has been used. When an electrode is produced using lithium cobalt oxide, it is possible to achieve a very large electrode density of greater than 3.9 g per cubic centimeter. However, on the other hand, the discharge capacity of lithium cobalt oxide is as small as approximately 150 mAh/g.

As the positive electrode active material for a lithium ion battery, a nickel-based positive electrode active material represented by LNCO (a composite oxide of Li, Ni, and Co), particularly, LNCAO (a composite oxide of Li, Ni, Co, and Al) is also being studied. The discharge capacity per unit weight of LNCAO is greater than that of cobalt-based positive electrode active materials and exceeds 190 mAhg$^{-1}$. However, this active material has a low density, and it is difficult to increase the electrode density, and thus it has not been possible to improve the discharge capacity per unit volume.

Patent Documents 1, 2, and 3 describe that the discharge capacity per unit volume of a lithium ion battery and the discharge capacity-holding properties are related to the breakdown strength or pressurized density of the positive electrode active material. Patent Document 1 describes the adjustment of the breakdown strength of the active material by controlling the composition and average particle diameter of an LCO-based positive electrode active material. Patent Document 2 describes the adjustment of the compressive strength of an LNCO-type positive electrode active material obtained by controlling the quantitative ratio between Ni atoms and Co atoms and powder characteristics of a Ni—Co hydroxide which is a raw material of the positive electrode active material. Patent Document 3 describes the adjustment of the pressurized density of an LNMCO-type positive electrode active material using a special spray drying method in the production of the active material. However, in this prior art, an LNCAO-type nickel-based positive electrode active material has not been studied.

RELATED ART DOCUMENT

Patent Document

[Patent Document 1] Japanese Unexamined Patent Application Publication No. 2004-220897

[Patent Document 2] Japanese Unexamined Patent Application Publication No. 2001-80920

[Patent Document 3] Japanese Unexamined Patent Application Publication No. 2012-253009

DISCLOSURE OF THE INVENTION

Problem that the Invention is to Solve

The present invention provides an LNCAO-type positive electrode active material for a lithium ion battery having excellent discharging capacity and discharging capacity-holding properties.

Means for Solving the Problems

The inventors of the present invention explored means enabling the control of the breakdown strength and compressive strength of LNCAO-based positive electrode active material particles such that they are in a range suitable for the battery discharge capacity and the battery discharge capacity-maintaining properties. As a result, surprisingly, simple means was found that was not a special method for directly controlling the selection of a raw material or the particle diameter of an active material which has been proposed in the related art. That is, in the present invention, it was found that the breakdown strength of the secondary particles of nickel-lithium metal composite oxide powder and the compressive strength of nickel-lithium metal composite oxide powder can be controlled to fall in a range suitable for battery performance by washing a fired nickel-lithium metal composite oxide with water.

The present invention will be described below.

(Invention 1) Nickel-lithium metal composite oxide powder including a nickel-lithium metal composite oxide represented by General Formula (1) described below:

$$Li_xNi_{1-y-z}M_yN_zO_{1.7-2.2} \quad (1)$$

(in Formula (1), M represents one or more metal elements selected from a group consisting of Co, Mn, Fe, and Cu, N represents one or more metal elements selected from a group consisting of Al, W, Ta, and B, $0.90<x<1.10$, $0.01<y<0.15$, and $0.005<z<0.10$), in which the breakdown strength of secondary particles is in a range of 80 MPa or less, the density is 3.30 g/cm³ or higher when compressed at a pressure of 192 MPa, and the density is 3.46 g/cm³ or higher when compressed at a pressure of 240 MPa.

(Invention 2) The nickel-lithium metal composite oxide powder according to Invention 1, in which, when 2 g of the nickel-lithium metal composite oxide represented by General Formula (1) is dispersed in 100 g of water, a supernatant has a hydrogen ion concentration of 11.0 or lower in terms of pH and has a content of LiOH of 0.1% by weight or less.

(Invention 3) The nickel-lithium metal composite oxide powder according to Invention 1 or 2, in which M in General Formula (1) is Co.

(Invention 4) The nickel-lithium metal composite oxide powder according to any one of Inventions 1 to 3, in which N in General Formula (1) is Al.

(Invention 5) The nickel-lithium metal composite oxide powder according to any one of Inventions 1 to 4, in which, in General Formula (1), M is Co, and N is Al.

(Invention 6) A positive electrode active material for a lithium ion battery including the nickel-lithium metal composite oxide powder according to any one of Inventions 1 to 5.

(Invention 7) A positive electrode for a lithium ion battery, in which the positive electrode active material for a lithium ion battery according to Invention 6 is used.

(Invention 8) A lithium ion battery, in which the positive electrode for a lithium ion battery according to Invention 7 is used.

(Invention 9) A method for producing nickel-lithium metal composite oxide powder including a nickel-lithium metal composite oxide represented by General Formula (1) described below:

$$Li_xNi_{1-y-z}M_yN_zO_{1.7-2.2} \quad (1)$$

(in Formula (1), M represents one or more metal elements selected from a group consisting of Co, Mn, Fe, and Cu, N represents one or more metal elements selected from a group consisting of Al, W, Ta, and B, $0.90<x<1.10$, $0.01<y<0.15$, and $0.005<z<0.10$), in which the breakdown strength of secondary particles is in a range of 80 MPa or less, the density is 3.30 g/cm³ or higher when compressed at a pressure of 192 MPa, and the density is 3.46 g/cm³ or higher when compressed at a pressure of 240 MPa, including a water washing step after a firing step for producing a nickel-lithium metal composite oxide powder precursor.

(Invention 10) The method for producing nickel-lithium metal composite oxide powder according to Invention 9, in which, when 2 g of the obtained nickel-lithium metal composite oxide powder is dispersed in 100 g of water, a supernatant has a hydrogen ion concentration of 11.0 or lower in terms of pH and has a content of LiOH of 0.1% by weight or less.

(Invention 11) The method for producing nickel-lithium metal composite oxide powder according to Invention 9 or 10, in which M in General Formula (1) is Co.

(Invention 12) The method for producing nickel-lithium metal composite oxide powder according to any one of Inventions 9 to 11, in which N in General Formula (1) is Al.

(Invention 13) The method for producing nickel-lithium metal composite oxide powder according to any one of Inventions 9 to 12, in which, in General Formula (1), M is Co, and N is Al.

(Invention 14) The method for producing nickel-lithium metal composite oxide powder according to any one of Inventions 9 to 13, in which, in the water washing step, the nickel-lithium metal composite oxide is washed with water having a weight that is 10% to 300% of the weight of the nickel-lithium metal composite oxide.

(Invention 15) The method for producing nickel-lithium metal composite oxide powder according to any one of Inventions 2 to 14, in which, in the water washing step, the nickel-lithium metal composite oxide is washed with water having a weight that is 50% to 100% of the weight of the nickel-lithium metal composite oxide.

(Invention 16) The method for producing nickel-lithium metal composite oxide powder according to any one of Inventions 9 to 15, further including a dehydration step after the water washing step.

(Invention 17) The method for producing nickel-lithium metal composite oxide powder according to Invention 16, in which, in the dehydration step, dehydration through filtration is carried out.

(Invention 18) The method for producing nickel-lithium metal composite oxide powder according to Invention 16, in which, in the dehydration step, dehydration through filtration and vacuum drying are carried out.

(Invention 19) The method for producing nickel-lithium metal composite oxide powder according to any one of Inventions 9 to 18, further including the dehydration step after the water washing step and a firing step after the dehydration step.

(Invention 20) The method for producing nickel-lithium metal composite oxide powder according to any one of Inventions 9 to 19, in which the firing step for producing a nickel-lithium metal composite oxide powder precursor is carried out after a powder-mixing step coming after a dissolution step, a precipitation step, a filtration and washing step, and a drying step of a raw material.

Advantage of the Invention

The nickel-lithium metal composite oxide powder of the present invention has high discharge capacity per unit volume and excellent discharging capacity-holding properties.

BEST MODE FOR CARRYING OUT THE INVENTION

A nickel-lithium metal composite oxide included in nickel-lithium metal composite oxide powder of the present invention is a compound represented by General Formula (1) described below:

$$Li_xNi_{1-y-z}M_yN_zO_{1.7-2.2} \quad (1)$$

(in Formula (1), M represents one or more metal elements selected from a group consisting of Co, Mn, Fe, and Cu, N represents one or more metal elements selected from a group consisting of Al, W, Ta, and B, $0.90<x<1.10$, $0.01<y<0.15$, and $0.005<z<0.10$).

The nickel-lithium metal composite oxide included in the nickel-lithium metal composite oxide powder of the present invention is preferably an oxide represented by General Formula (2) described below in which M is Co and N is Al in General Formula (1):

$$Li_xNi_{1-y-z}Co_yAl_zO_{1.7-2.2} \quad (2)$$

(in Formula (2), $0.90<x<1.10$, $0.01<y<0.15$, and $0.005<z<0.10$).

The nickel-lithium metal composite oxide powder of the present invention can be produced using the following method.

(1. Dissolution of raw materials) As raw materials, soluble metal salts such as hydrosulfates and nitrates of the metals included in General Formula (1) can be used. In a case in which nitrate is used, a costly treatment is required for a waste liquid containing nitrate-nitrogen, and thus the use of nitrates is not preferable in an industrial sense. Generally, a hydrosulfate of a metal included in General Formula (1) is used. In a method for producing the nickel-lithium metal composite oxide powder of the present invention, first, nickel sulfate and cobalt sulfate, which are raw materials, are respectively dissolved in water.

(2. Precipitation) An aqueous solution of nickel sulfate, an aqueous solution of cobalt sulfate, and sodium hydroxide and ammonia water as a precipitating agent are mixed together in a precipitation tank. A co-precipitate of nickel hydroxide and cobalt hydroxide is generated.

(3. Filtration and washing) The precipitate is filtered, and moisture is removed, thereby separating out a hydroxide cake. The hydroxide cake is washed with an aqueous solution of sodium hydroxide, thereby removing sulfate ions. Furthermore, the hydroxide cake is washed with pure water, thereby removing sodium hydroxide. A precursor cake including nickel hydroxide and cobalt hydroxide is obtained in the above-described manner.

(4. Drying) The precursor cake is dried. As a drying method, any of hot-air drying at atmospheric pressure, infrared drying, vacuum drying, and the like may be used. When vacuum drying is used, it is possible to dry the precursor cake within a short period of time. The drying is continued until the content of moisture in the precursor reaches approximately 1% by weight.

(5. Powder mixing) Aluminum hydroxide and lithium hydroxide powder are added to the dried precursor powder, and the components are mixed together by applying a shear force.

(6. Firing) The mixture is fired in the presence of oxygen. The firing causes the following reactions.

$$4Co(OH)_2+4LiOH+O_2 \rightarrow 4LiCoO_2+6H_2O$$

$$Al(OH)_3+LiOH \rightarrow LiAlO_2+2H_2O$$

$$4Ni(OH)_2+4LiOH+O_2 \rightarrow 4LiNiO_2+6H_2O$$

(7. Water washing) In the production of the nickel-lithium metal composite oxide powder of the present invention, the fired nickel-lithium metal composite oxide is washed with water. The fired nickel-lithium metal composite oxide is washed with water having a weight that is 10% by weight to 300% by weight, preferably 20% by weight to 300% by weight, and more preferably 50% by weight to 100% by weight of the weight of the nickel-lithium metal composite oxide. When the amount of water being used is within the above-described range, the effect of the water washing is sufficient, a desired particle breakdown strength can be obtained, and the battery performance becomes favorable.

(8. Dehydration) The washed nickel-lithium metal composite oxide contains a large amount of moisture. In a dehydration step after the water washing step, moisture in the nickel-lithium metal composite oxide is removed. Dehydration is carried out through filtration. Alternately, dehydration is carried out through a combination of filtration and subsequent vacuum drying. Through the dehydration step, a majority of moisture in the nickel-lithium metal composite oxide is removed. The content of water in the dried nickel-lithium metal composite oxide needs to be suitable for the efficiency of the following firing step, and is generally 1.0% by weight or less, preferably 0.5% by weight or less, and more preferably 0.1% by weight or less. The moisture value after rough finishing is preferably within the above-described range since the battery performance becomes favorable and there is no waste in the production efficiency in the drying step.

(9. Firing) After the dehydration step, the nickel-lithium metal composite oxide is fired. The firing temperature is in a range of 300° C. to 800° C. When the firing temperature is in the above-described range at this time, moisture is sufficiently removed, the crystal structure of the active material does not break, and the battery performance becomes favorable.

The nickel-lithium metal composite oxide powder of the present invention is completed through the above-described steps 1 to 9. In the present invention, the use of the production method including the above-described water washing step enables the obtainment of nickel-lithium metal composite oxide powder having the controlled breakdown strength and compressive strength of secondary particles. When the nickel-lithium metal composite oxide powder of the present invention is used as a lithium ion battery positive electrode active material, the active material can be disposed on an electrode in a high density, and the battery performance improves.

The excellent properties of the nickel-lithium metal composite oxide powder of the present invention are considered to result from the fact that the above-described step (7. Water washing) is provided in the production method. The discharge characteristics of the nickel-lithium metal composite oxide powder of the present invention do not deteriorate compared with those of nickel-lithium metal composite oxide powder that is not subjected to the water washing. That is, it can be assumed that the above-described water washing does not cause any phenomenon deteriorating the discharge characteristics such as the desorption of lithium ions from between crystal layers. Furthermore, the particle size distribution of the nickel-lithium metal composite oxide powder of the present invention does not significantly change compared with nickel-lithium metal composite oxide powder that is not subjected to the water washing. That is, it can be assumed that the above-described water washing does not cause any undesirable phenomenon such as the agglomeration of the nickel-lithium metal composite oxide powder or particle breakage.

As described above, in the present invention, the discharge characteristics or the particle characteristics are not deteriorated, and the breakdown strength or compressive strength of the positive electrode active material is successfully controlled. It is an astonishing fact that the above-described achievements can be obtained in the present invention although there has been a concern of a variety of adverse effects caused by the water washing of the lithium ion battery positive electrode active material in the related art.

Furthermore, in the present invention, undesirable components for the battery performance, which are included in the nickel-lithium metal composite oxide powder, are decreased. Examples of the undesirable components include alkaline Li compounds such as LiOH which cause the gelation of a positive electrode slurry, and the like. As a result of measuring the amount of LiOH included in the nickel-lithium metal composite oxide powder of the present invention through titration, it is confirmed that the amount of LiOH is decreased to less than 0.1% by weight. The pH of a supernatant generated when 2 g of the nickel-lithium metal composite oxide powder of the present invention is dispersed in 100 g of water is decreased to less than 11.0.

The nickel-lithium metal composite oxide powder of the present invention can be used as a positive electrode active material for a lithium ion battery. The positive electrode active material for a lithium ion battery may be constituted only with the nickel-lithium metal composite oxide powder of the present invention or may be obtained by mixing the nickel-lithium metal composite oxide powder of the present invention with another nickel-lithium metal composite oxide powder in an amount at which the advantages of the nickel-lithium metal composite oxide powder are exhibited. For example, it is possible to use a mixture of 50 parts by weight of the nickel-lithium metal composite oxide of the present invention and 50 parts by weight of a positive electrode active material for a lithium ion secondary battery, which is not the present invention, as the positive electrode active material. In the case of producing a positive electrode of a lithium ion battery, a positive electrode active material including the above-described nickel-lithium metal composite oxide of the present invention, a conductive aid, a binder, and an organic solvent for dispersion are added so as to prepare a mixed slurry for a positive electrode, and the slurry is applied to the electrode.

EXAMPLES

Example 1

An aqueous solution of sodium hydroxide was added to an aqueous solution obtained by dissolving nickel sulfate and cobalt sulfate, and the generated precipitate was filtered, washed, and dried. A nickel hydroxide-cobalt hydroxide co-precipitate was obtained. Lithium hydroxide and aluminum hydroxide were mixed into the obtained nickel hydroxide-cobalt hydroxide co-precipitate in a powder form, thereby obtaining a firing raw material. This firing raw material was fired at 780° C. in an oxygen stream. The fired substance was subsequently subjected to a water washing step.

In the water washing step, 150 g (100% by weight of the fired substance) of water was added to 150 g of the fired substance, the fired substance and water were stirred, and the fired substance was filtered. A separated cake was vacuum-dried at 100° C. until the content of moisture in the cake reached 1% by weight or less. The obtained dried cake was fired in a muffle furnace at 500° C. for five hours in an oxygen stream, thereby obtaining nickel-lithium metal composite oxide powder.

Example 2

Nickel-lithium metal composite oxide powder was produced under the same conditions as in Example 1 except for the fact that, in the water washing step, 75 g (50% by weight of the fired substance) of water was added to 150 g of the fired substance, and was stirred and filtered.

Example 3

Nickel-lithium metal composite oxide powder was produced under the same conditions as in Example 1 except for the fact that, in the water washing step, 50 g (33% by weight of the fired substance) of water was added to 150 g of the fired substance, and was stirred and filtered.

Example 4

Nickel-lithium metal composite oxide powder was produced under the same conditions as in Example 1 except for the fact that, in the water washing step, 30 g (20% by weight of the fired substance) of water was added to 150 g of the fired substance, and was stirred and filtered.

Example 5

Nickel-lithium metal composite oxide powder was produced under the same conditions as in Example 1 except for the fact that, in the water washing step, 200 g (133% by weight of the fired substance) of water was added to 150 g of the fired substance, and was stirred and filtered.

Example 6

Nickel-lithium metal composite oxide powder was produced under the same conditions as in Example 1 except for the fact that, in the water washing step, 250 g (167% by weight of the fired substance) of water was added to 150 g of the fired substance, and was stirred and filtered.

Comparative Example 1

The water washing step of Example 1 was not carried out, and the fired nickel-lithium metal composite oxide powder was used as a comparative product.

Comparative Example 2

Nickel-lithium metal composite oxide powder for comparison was produced under the same conditions as in Example 1 except for the fact that, in the water washing step, 7.5 g (5% by weight of the fired substance) of water was added to 150 g of the fired substance, and was stirred and filtered.

Example 7

Nickel-lithium metal composite oxide powder was produced in a larger scale. In the water washing step, 2000 g (100% by weight of the fired substance) of water was added to 2000 g of the fired substance, and was stirred and filtered. A separated cake was not vacuum-dried and was fired using a muffle furnace at 500° C. for five hours in an oxygen stream. Other conditions were set in the same manner as in Example 1. Nickel-lithium metal composite oxide powder was produced as described above.

Example 8

Nickel-lithium metal composite oxide powder was produced under the same conditions as in Example 7 except for the fact that a separated cake was fired using a large-sized electric furnace at 500° C. in an oxygen stream.

Example 9

Nickel-lithium metal composite oxide powder was produced under the same conditions as in Example 7 except for the fact that a separated cake was fired using an actual production electric furnace at 500° C. in an oxygen stream.

Comparative Example 3

A positive electrode active material for a lithium ion battery produced by ShenZhen TianJiao Technology Co., Ltd. (trade name: NCA1301-1ZS) was used as a comparative product and was evaluated.

The following evaluations were carried out on the nickel-lithium metal composite oxide powders of the present invention obtained in the examples and the nickel-lithium metal composite oxide powders for comparison obtained in the comparative examples.

(Breakdown strength of secondary particles) A small amount of the nickel-lithium metal composite oxide powder was scattered on a lower pressurization plate in a micro compression tester (Shimadzu's micro compression tester MCT-510), and a compression test was carried out on every particle under microscopic observation, thereby measuring the breakdown strengths of the particles. The measurement results are shown in Table 1.

(Pressurized density) As a powder pressing machine, a P-16B pressing machine manufactured by Riken Seiki Co., Ltd. was used. As a powder pressing die, a die manufactured by International Crystal Laboratories (13 mm KBR Die, inner diameter of 13 mm) was used. 1.00 g of nickel-lithium metal composite oxide powder was accurately weighed and was installed in the powder pressing die. The powder was pressurized in the powder pressing machine for five minutes. The heights of the pressing die before and after the pressurization were measured, and the density of the nickel-lithium metal composite oxide powder after pressing was computed. The computation results are shown in Table 1.

TABLE 1

| | Water washing conditions Amount of water (% by weight in relation to powder) | Execution of vacuum drying | Evaluation | | |
|---|---|---|---|---|---|
| | | | Breakdown strength (MPa) | Density under pressurization at 192 MPa (g/cm³) | Density under pressurization at 240 MPa (g/cm³) |
| Example 1 | 100 | Yes | 62.4 | 3.5 | 3.6 |
| Example 2 | 50 | Yes | 67.8 | 3.4 | 3.5 |
| Example 3 | 33 | Yes | 73.9 | 3.3 | 3.5 |
| Example 4 | 20 | Yes | 79.7 | 3.3 | 3.5 |
| Example 5 | 133 | Yes | 51.8 | 3.5 | 3.6 |
| Example 6 | 167 | Yes | 51.3 | 3.6 | 3.6 |
| Example 7 | 100 | No | 62.0 | 3.4 | 3.5 |
| Example 8 | 100 | No | 61.8 | 3.3 | 3.5 |
| Example 9 | 100 | No | 61.8 | 3.3 | 3.4 |
| Comparative Example 1 | 0 (No water washing) | No | 81.8 | 3.3 | 3.4 |
| Comparative Example 2 | 5 | Yes | 81.0 | 3.3 | 3.4 |
| Comparative Example 3 | 0 (No water washing) | No | 26.0 | 3.2 | 3.3 |

In addition, the pH values and other analysis results of the nickel-lithium metal composite oxide powders obtained in the examples and the comparative examples are shown in Table 2.

TABLE 2

| | Water washing conditions Amount of water (% by weight in relation to powder) | Execution of vacuum drying | Analysis results | | | | |
|---|---|---|---|---|---|---|---|
| | | | pH at 25° C. | Content of LiOH (% by weight) | Content of $Li_2CO_3$ (% by weight) | Content of $LiAlO_2$ (% by weight) | Content of Li (% by weight) |
| Example 1 | 100 | Yes | 10.70 | 0.09 | 0.07 | 0.06 | 0.05 |
| Example 2 | 50 | Yes | 10.90 | 0.09 | 0.12 | 0.05 | 0.05 |

TABLE 2-continued

| | Water washing conditions Amount of water (% by weight in relation to powder) | Execution of vacuum drying | Analysis results | | | | |
|---|---|---|---|---|---|---|---|
| | | | pH at 25° C. | Content of LiOH (% by weight) | Content of $Li_2CO_3$ (% by weight) | Content of $LiAlO_2$ (% by weight) | Content of Li (% by weight) |
| Example 3 | 33 | Yes | 11.00 | 0.15 | 0.20 | 0.07 | 0.09 |
| Example 4 | 20 | Yes | 11.30 | 0.20 | 0.30 | 0.19 | 0.16 |
| Example 5 | 133 | Yes | 10.60 | 0.05 | 0.05 | 0.06 | 0.04 |
| Example 6 | 167 | Yes | 10.50 | 0.04 | 0.06 | 0.06 | 0.04 |
| Example 7 | 100 | No | 10.80 | 0.09 | 0.11 | 0.05 | 0.05 |
| Example 8 | 100 | No | 10.90 | 0.10 | 0.14 | 0.07 | 0.06 |
| Example 9 | 100 | No | 10.70 | 0.08 | 0.05 | 0.04 | 0.04 |
| Comparative Example 1 | 0 (No water washing) | No | 11.70 | 0.61 | 0.31 | 0.29 | 0.27 |
| Comparative Example 2 | 5 | Yes | 11.60 | 0.65 | 0.34 | 0.25 | 0.25 |
| Comparative Example 3 | 0 (No water washing) | No | 11.50 | 0.59 | 2.10 | 0.25 | 1.04 |

INDUSTRIAL APPLICABILITY

Nickel-lithium metal composite oxide powder and a positive electrode active material for a lithium ion secondary battery including the same satisfy the recent requirement of an increase in the capacity of a secondary battery for small electronic devices and the like, also satisfy an increase in the capacity and a decrease in the size which are required for a power supply used in a large secondary battery for an electric vehicle and a stationary storage battery, and are extremely meaningful in an industrial sense.

The invention claimed is:

1. Nickel-lithium metal composite oxide powder comprising: a nickel-lithium metal composite oxide represented by General Formula (1) described below:

$$Li_xNi_{1-y-z}M_yN_zO_{1.7-2.2} \tag{1}$$

in Formula (1), M represents one or more metal elements selected from a group consisting of Co, Mn, Fe, and Cu, N represents one or more metal elements selected from a group consisting of Al, W, Ta, and B, $0.90<x<1.10$, $0.01<y<0.15$, and $0.005<z<0.10$, wherein the breakdown strength of secondary particles is in a range of 80 MPa or less, the density is 3.30 g/cm³ or higher when compressed at a pressure of 192 MPa and the density is 3.46 g/cm³ or higher when compressed at a pressure of 240 MPa, wherein, when 2 g of the nickel-lithium metal composite oxide represented by General Formula (1) is dispersed in 100 g of water, a supernatant has a hydrogen ion concentration of 11.0 or lower in terms of pH and has a content of LiOH of 0.1% by weight or less.

2. The nickel-lithium metal composite oxide powder according to claim 1,
wherein M in General Formula (1) is Co.

3. The nickel-lithium metal composite oxide powder according to claim 1,
wherein N in General Formula (1) is Al.

4. The nickel-lithium metal composite oxide powder according to claim 1,
wherein, in General Formula (1), M is Co, and N is Al.

5. A positive electrode active material for a lithium ion battery, comprising:
the nickel-lithium metal composite oxide powder according to claim 1.

6. A positive electrode for a lithium ion battery,
wherein the positive electrode active material for a lithium ion battery according to claim 5 is used.

7. A lithium ion battery,
wherein the positive electrode for a lithium ion battery according to claim 6 is used.

8. A method for producing nickel-lithium metal composite oxide powder including a nickel-lithium metal composite oxide represented by General Formula (1) described below:

$$Li_xNi_{1-y-z}M_yN_zO_{1.7-2.2} \tag{1}$$

in Formula (1), M represents one or more metal elements selected from a group consisting of Co, Mn, Fe, and Cu, N represents one or more metal elements selected from a group consisting of Al, W, Ta, and B, $0.90<x<1.10$, $0.01<y<0.15$, and $0.005<z<0.10$,
wherein the breakdown strength of secondary particles is in a range of 80 MPa or less,
the density is 3.30 g/cm³ or higher when compressed at a pressure of 192 MPa, and
the density is 3.46 g/cm³ or higher when compressed at a pressure of 240 MPa, comprising:
a water washing step after a firing step for producing a nickel-lithium metal composite oxide powder precursor.

9. The method for producing nickel-lithium metal composite oxide powder according to claim 8,
wherein, when 2 g of the obtained nickel-lithium metal composite oxide powder is dispersed in 100 g of water, a supernatant has a hydrogen ion concentration of 11.0 or lower in terms of pH and has a content of LiOH of 0.1% by weight or less.

10. The method for producing nickel-lithium metal composite oxide powder according to claim 8,
wherein M in General Formula (1) is Co.

11. The method for producing nickel-lithium metal composite oxide powder according to claim 8,
wherein N in General Formula (1) is Al.

12. The method for producing nickel-lithium metal composite oxide powder according to claim 8,
wherein, in General Formula (1), M is Co, and N is Al.

13. The method for producing nickel-lithium metal composite oxide powder according to claim 8,
wherein, in the water washing step, the nickel-lithium metal composite oxide is washed with water having a weight that is 10% to 300% of the weight of the nickel-lithium metal composite oxide.

14. The method for producing nickel-lithium metal composite oxide powder according to claim 8,
wherein, in the water washing step, the nickel-lithium metal composite oxide is washed with water having a weight that is 50% to 100% of the weight of the nickel-lithium metal composite oxide.

15. The method for producing nickel-lithium metal composite oxide powder according to claim 8, further comprising:
a dehydration step after the water washing step.

16. The method for producing nickel-lithium metal composite oxide powder according to claim 15,
wherein, in the dehydration step, dehydration through filtration is carried out.

17. The method for producing nickel-lithium metal composite oxide powder according to claim 15,
wherein, in the dehydration step, dehydration through filtration and vacuum drying are carried out.

18. The method for producing nickel-lithium metal composite oxide powder according to claim 8, further comprising:
the dehydration step after the water washing step and a firing step after the dehydration step.

19. The method for producing nickel-lithium metal composite oxide powder according to claim 8,
wherein the firing step for producing a nickel-lithium metal composite oxide powder precursor is carried out after a powder-mixing step coming after a dissolution step, a precipitation step, a filtration and washing step, and a drying step of a raw material.

\* \* \* \* \*